United States Patent
Teng et al.

(10) Patent No.: US 11,222,256 B2
(45) Date of Patent: Jan. 11, 2022

(54) NEURAL NETWORK PROCESSING SYSTEM HAVING MULTIPLE PROCESSORS AND A NEURAL NETWORK ACCELERATOR

(71) Applicant: Xilinx, Inc., San Jose, CA (US)

(72) Inventors: Xiao Teng, Cupertino, CA (US); Aaron Ng, San Jose, CA (US); Ashish Sirasao, San Jose, CA (US); Elliott Delaye, San Jose, CA (US)

(73) Assignee: XILINX, INC., San Jose, CA (US)

( * ) Notice: Subject to any disclaimer, the term of this patent is extended or adjusted under 35 U.S.C. 154(b) by 1009 days.

(21) Appl. No.: 15/785,685

(22) Filed: Oct. 17, 2017

(65) Prior Publication Data

US 2019/0114534 A1    Apr. 18, 2019

(51) Int. Cl.
*G06N 3/063* (2006.01)
*G06N 3/08* (2006.01)
*G06N 3/04* (2006.01)

(52) U.S. Cl.
CPC ............ *G06N 3/063* (2013.01); *G06N 3/04* (2013.01); *G06N 3/0454* (2013.01); *G06N 3/08* (2013.01)

(58) Field of Classification Search
CPC ............ G06N 3/063; G06N 3/04; G06N 3/08; G06N 3/0454
USPC .......................................................... 706/31
See application file for complete search history.

(56) References Cited

U.S. PATENT DOCUMENTS

| | | |
|---|---|---|
| 6,346,825 B1 | 2/2002 | Pang et al. |
| 9,710,265 B1 | 7/2017 | Temam et al. |
| 2008/0262984 A1* | 10/2008 | Xu .................. G06F 16/334 706/12 |
| 2010/0076915 A1 | 3/2010 | Xu et al. |
| 2015/0199963 A1 | 7/2015 | Maaninen |
| 2016/0210167 A1* | 7/2016 | Bolic ............... G06F 9/45558 |

(Continued)

FOREIGN PATENT DOCUMENTS

| | | |
|---|---|---|
| CN | 107239829 | 10/2017 |
| WO | 2016077393 | 5/2016 |

OTHER PUBLICATIONS

Going Deeper with Embedded FPGA Platform for Convolutional Neural Network (Year: 2016).*

(Continued)

*Primary Examiner* — Michael J Huntley
*Assistant Examiner* — Em N Trieu
(74) *Attorney, Agent, or Firm* — Crawford Maunu PLLC

(57) ABSTRACT

At least one neural network accelerator performs operations of a first subset of layers of a neural network on an input data set, generates an intermediate data set, and stores the intermediate data set in a shared memory queue in a shared memory. A first processor element of a host computer system provides input data to the neural network accelerator and signals the neural network accelerator to perform the operations of the first subset of layers of the neural network on the input data set. A second processor element of the host computer system reads the intermediate data set from the shared memory queue, performs operations of a second subset of layers of the neural network on the intermediate data set, and generates an output data set while the neural network accelerator is performing the operations of the first subset of layers of the neural network on another input data set.

15 Claims, 11 Drawing Sheets

(56) References Cited

U.S. PATENT DOCUMENTS

2018/0314936 A1* 11/2018 Barik .................... G06N 5/003

OTHER PUBLICATIONS

Akesson, Benny, "An introduction to SDRAM and memory controllers," downloaded Sep. 25, 2017 from http://www.es.ele.tue.nl/premadona/files/akesson01.pdf, pp. 1-30, Eindhoven University of Technology, Eindhoven, The Netherlands.

Chetlur, Sharan et al., "cuDNN: Efficient Primitives for Deep Learning," submitted Oct. 3, 2014, pp. 1-9, https://arxiv.org/pdf/1410.0759.pdf, Cornell University Library.

Di Carlo, Stefano et al., "An Area-Efficient 2-D Convolution Implementation on FPGA for Space Applications," Proc. of the 2011 IEEE 6th International Design & Test Workshop, Dec. 11, 2011, pp. 88-92, IEEE, Piscataway, New Jersey, USA.

Gysel, Philipp, "Ristretto: Hardware-Oriented Approximation of Convolutional Neural Networks," May 20, 2016, pp. 1-73, https://arxiv.org/abs/1605.06402, Cornell University Library.

Khronos, "clSetKernelArg," downloaded Sep. 22, 2017 from https://www.khronos.org/registry/OpenCL/sdk/1.0/docs/man/xhtml/clSetKernelArg.html, copyright 2007, pp. 1-4, Khronos Group, Beaverton, Oregon, USA.

Krizhevsky, Alex et al., "ImageNet Classification with Deep Convolutional Neural Networks," Proc. of the 12th International Conference on Neural Processing Systems, Dec. 3, 2012, pp. 1097-1105, ACM Digital Library, www.acm.org.

Mathworks, "im2col," dowloaded Sep. 22, 2017 from https://www.mathworks.com/help/images/ref/im2col.html?searchHighlight=im2col&s_tid=doc_srchtitle, pp. 1-3.

Saxena, Abhineet, "Convolutional Neural Networks (CNNs): An Illustrated Explanation," Jun. 20, 2016, downloaded Sep. 25, 2017 from http://xrds.acm.org/blog/2016/06/convolutional-neural-networks-cnns-illustrated-explanation/, pp. 1-15.

Shaaban, Muhammed, "Systolic Architectures," Mar. 11, 2003, Kate Gleason College of Engineering, Rochester Institute of Technology, Rochester, New York, USA.

Stanford, "CS231n Convolutional Neural Networks for Visual Recognition," downloaded Sep. 25, 2017 from http://cs231n.stanford.edu/, pp. 1-23, Stanford University, Stanford, California, USA.

Warden, Pete, "Why GEMM is at the heart of deep learning," Apr. 20, 2015, pp. 1-9, downloaded from https://betewarden.com/2015/04/20/why-gemm-is-at-the-heart-of-deep-learning/.

Wikipedia, "Convolutional neural network," Sep. 20, 2017, pp. 1-13, downloaded from https://en.wikipedia.org/wiki/Convolutional_neural_network.

Wikipedia, "Deep learning," Sep. 24, 2017, pp. 1-13, downloaded from https://en.wikipedia.org/wiki/Deep_learning.

Wikpedia, "Matrix Multiplication," Sep. 20, 2017, pp. 1-19, downloaded from https://en.wikipedia.org/wiki/Matrix_multiplication.

Wikipedia, "Multiprocessing," May 10, 2017, pp. 1-4, dowloaded from https://en.wikipedia.org/wiki/Multiprocessing.

Wikipedia, "Producer-consumer problem," Sep. 7, 2017, pp. 1-9, downloaded from https://en.wikipedia.org/wiki/Producer%E2%80%93consumer_problem.

Wikipedia, "Row- and colum-major order," Aug. 23, 2017, pp. 1-5, downloaded from https://en.wikipedia.org/wiki/Row-_and_column-major_order.

Wikipedia, "Systolic array," Mar. 22, 2017, pp. 1-5, downloaded from https://en.wikipedia.org/wiki/Systolic_array.

Wikipedia, "Very long instruction word," Jul. 13, 2017, pp. 1-3, downloaded from https://en.wikipedia.org/wiki/Very_long_instruction_word.

Xilinx, "Smarter Data Center," downloaded Sep. 22, 2017 from https://www.xilinx.com/applications/data-center.html, pp. 1-4, Xilinx, Inc., San Jose, California, USA.

Xilinx, "SDSoC Development Environment," downloaded Sep. 22, 2017 from https://www.xilinx.com/products/design-tools/software-zone/sdsoc.html, pp. 1-16, Xilinx, Inc., San Jose, California, USA.

Xilinx, "UltraScale Architecture DSP Slice User Guide," UG579 (v1.3), Nov. 24, 2015, pp. 1-74, Xilinx, Inc., San Jose, California, USA.

Xilinx, "Vivado High-Level Synthesis," downloaded Sep. 22, 2017 from https://www.xilinx.com/products/design-tools/vivado/integration/esl-design.html, pp. 1-2, Xilinx, Inc., San Jose, California, USA.

Xilinx, "Deep Learning with INT8 Optimization on Xilinx Devices," WP486 (v1.0.1), Apr. 24, 2017, pp. 1-11, Xilinx, Inc., San Jose, California, USA.

Xilinx, "Implementing Memory Structures for Video Processing in the Vivado HLS Tool," XAPP793 (v1.0), Sep. 20, 2012, pp. 1-8, Xilinx, Inc., San Jose, California, USA.

Xilinx, "Two-Dimensional Linear Filtering," XAPP933 (v1.1), Oct. 23, 2007, pp. 1-8, Xilinx, Inc., San Jose, California, USA.

Alwani, Manoj et al., "Fused-Layer CNN Accelerators," 2016 49th Annual International Symposium on Microarchitecture, Oct. 15, 2016 pp. 1-12, IEEE, Piscataway, New Jersey, USA.

Chakradhar, Srimat et al., "A Dynamically Configurable Coprocessor for Convolutional Neural Networks," Proc. of the 2015 ACM/SIGDA International Symposium on Field-Programmable Gate Arrays, Feb. 22, 2015, pp. 161-170, IEEE, Piscataway, New Jersey, US.

Gokhale, Vinayak et al., "A 240 G-ops/s Mobile Coprocessor for Deep Neural Networks," Proc. of the IEEE Conference on Computer Vision and Pattern Recognition, Jun. 1, 2014, pp. 682-687, IEEE, Piscataway, New Jersey, USA.

Qiu, Jiantao et al., "Going Deeper with Embedded FPGA Platform for Convolutional Neural Network," Proc. of the 2016 ACM/SIGDA International Symposium on Field-Programmable Gate Arrays, Jan. 1, 2016, pp. 26-35, IEEE, Piscataway, New Jersey, USA.

Zhang, Chen et al., "Caffeine: Towards Uniformed Representation and Acceleration for Deep Convolutional Neural Networks," Proc. of the 2016 IEEE/ACM International Conference on Computer-Aided Design, Nov. 7, 2016, pp. 1-8, IEEE, Piscataway, New Jerse.

Zhang, Chen et al., "Optimizing FPGA-based Acclerator Design for Deep Convolutional Neural Networks," Proc. of the 2016 ACM/SIGDA International Symposium on Field-Programmable Gate Arrays, Feb. 22, 2015, pp. 161-170, IEEE, Piscataway, New Jersey, USA.

* cited by examiner

NEURAL NETWORK PROCESSING SYSTEM HAVING MULTIPLE PROCESSORS AND A NEURAL NETWORK ACCELERATOR

TECHNICAL FIELD

The disclosure generally relates to neural network processing systems.

BACKGROUND

Machine learning is the science of inducing computing systems to act without being explicitly programmed. Classical machine learning includes various clustering and classification techniques, including K-means clustering, linear and logistic regressions, stochastic gradient decent, association rule learning, and the like. Deep learning is a newer frontier in machine learning. Deep learning is a class of machine learning algorithms that uses multiple layers of nonlinear processing units for feature extraction and transformation. Deep learning algorithms can be unsupervised (e.g., pattern analysis) or supervised (e.g., classification). The deep learning algorithm can be implemented using layers of an artificial neural network (ANN) (referred to herein as a "neural network").

In general, a neural network is a collection of nodes (i.e., the "neurons") that are connected in a graph. A node in a neural network computes a sum of weighted inputs and adds an optional bias to the sum. The output of the node is a function of the final sum (referred to as an "activation function"). Example activation functions include the sigmoid function, the hyperbolic tangent (tank) function, the Rectified Linear Unit (ReLU) function, and the identity function. Neural network models are often organized into layers of nodes, which define a specific topology, and corresponding weights and biases. The weights and biases are referred to as network parameters.

In general, a neural network includes an input layer and an output layer and can optionally include one or more hidden layers between the input and output layers. A neural network used in deep learning applications typically includes many hidden layers, which gives rise to the term deep neural network (DNN). The layers of a neural network can be densely connected (e.g., each node in a layer is fully connected to all nodes in a previous layer) or sparsely connected (e.g., each node in a layer is connected to only a portion of the nodes in a previous layer). A convolutional neural network (CNN) is a type of DNN that includes one or more sparsely connected layers, referred to as convolutional layers. A CNN is well-suited for processing image or video data. Other types of DNNs include recurrent neural network (RNNs), which are well-suited for processing speech and text data.

Field programmable gate arrays (FPGAs) have been used to implement circuits that accelerate functions called from software. Circuits that accelerate functions called from software are referred to as hardware accelerators. Examples of hardware accelerators include various image filters implemented as FPGA circuits that can be called from image processing software. In order for a hardware accelerator to be beneficial in a system having a host computer system executing software that initiates the hardware accelerator, the performance improvement provided by the hardware accelerator should be greater than the processing overhead involved in moving data between the host computer system and the hardware accelerator. If more time is required to move data between the host computer system and the hardware accelerator than would be required for the host computer system to perform the operations rather than the hardware accelerator, a better implementation may include the host computer system without a hardware accelerator. Also, if the hardware accelerator is idle while waiting for the host computer system, the overall performance advantage offered by the hardware accelerator is diminished.

SUMMARY

A disclosed neural network processing system includes a shared memory, at least one neural network accelerator, and a host computer system. The neural network accelerator is configured to perform operations of a first subset of layers of a neural network on an input data set, generate an intermediate data set, and store the intermediate data set in a shared memory queue in the shared memory. The host computer system has first and second processor elements. The first processor element is configured to execute instructions that cause the first processor element to provide input data to the neural network accelerator and signal the neural network accelerator to perform the operations of the first subset of layers of the neural network on the input data set. The second processor element is configured to execute instructions that cause the second processor element to read the intermediate data set from the shared memory queue, perform operations of a second subset of layers of the neural network on the intermediate data set, and generate an output data set while the neural network accelerator is performing the operations of the first subset of layers of the neural network on another input data set.

A disclosed method includes providing input data to a neural network accelerator by a first processor element of a host computer system. The first processor element signals the neural network accelerator to perform operations of a first subset of layers of a neural network on the input data and the neural network accelerator performs the operations of the first subset of layers of the neural network on the input data set. The neural network accelerator generates an intermediate data set and stores the intermediate data set in a shared memory queue in a shared memory. A second processor element of the host computer system reads the intermediate data set from the shared memory queue and performs operations of a second subset of layers of the neural network on the intermediate data set while the neural network accelerator is performing the operations of the first subset of layers of the neural network on another input data set. The second processor element generates an output data set.

Other features will be recognized from consideration of the Detailed Description and Claims, which follow.

BRIEF DESCRIPTION OF THE DRAWINGS

Various aspects and features of the methods and systems will become apparent upon review of the following detailed description and upon reference to the drawings in which.

DETAILED DESCRIPTION

Figure 1:
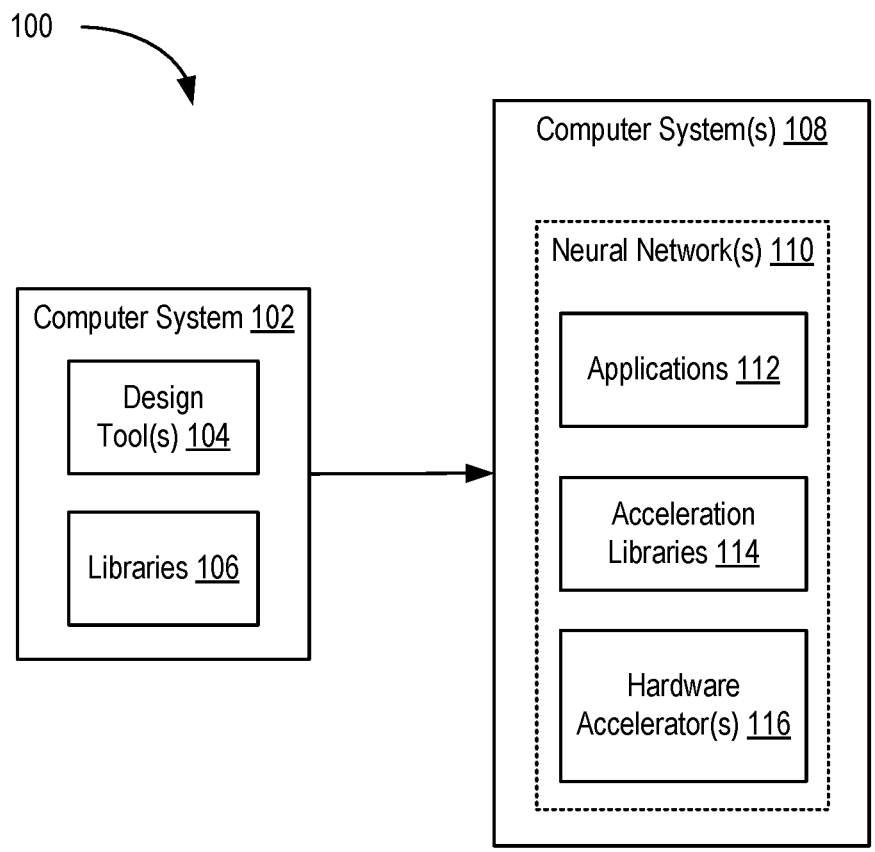
FIG. 1 is a block diagram depicting a system for implementing neural networks according to an example.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed methods and systems are applicable to convolutional neural networks (CNNs), recurrent neural networks (RNNs) and other neural networks involving operations such as matrix multiplication or convolution. A CNN can be represented as a directed graph having layers of operations. Each layer can entail one or more operations, such as CONV (Convolution), or image-to-column conversion ("im2col"), general matrix multiplication ("GEMM"), activation (e.g., a rectified linear unit, "RELU" function), pooling (e.g., "maxpool"), local response normalization (LRN layer), and inner product (e.g., "fully connected" (FC) layer). The inputs to each layer are data, such as images or voice samples, and trained weights, all represented as matrices.

The disclosed implementations are suitable in a neural network processing system that includes a host computer system and a neural network accelerator. The host computer system executes software that controls the overall flow of neural network processing, and the neural network accelerator is the hardware accelerator for operations in selected layers of the neural network. For brevity, the host computer system may also be referred to as a "host," and a neural network accelerator may also or alternatively be referred to as an "acceleration circuit," a "kernel accelerator" or a "kernel accelerator circuit."

In applications such as CNNs, the inventors have found that a performance benefit can be realized by implementing some layers of the CNN on a neural network accelerator, and implementing others of the layers on the host. However, when some operations in a forward propagation of the CNN run on the host, the neural network accelerator may be idle, which reduces the utilization and operational efficiency of the neural network accelerator. The disclosed methods and systems nearly eliminate idling by the neural network accelerator and provide a user configurable parameter to balance workloads between the host and the neural network accelerator and improve performance.

In the disclosed approaches, a first processor element of a host and a neural network accelerator are pipelined with a second processor element of the host in order to reduce the idle time of the neural network accelerator. The first processor element and the neural network accelerator function together as a producer and perform neural network operations of a first subset of layers of a neural network. The second processor element functions as consumer of processed data from the neural network accelerator and performs operations of a second subset of layers of the neural network. The first processor element and second processor element cooperatively keep the neural network accelerator busy through coordinated use of a shared memory queue. As used herein, a "processor element" can be a processor core of a computer system, heterogeneous processor circuits, or threads executing on one or more processor cores or processor circuits.

Turning now to the drawings, FIG. 1 is a block diagram depicting a system 100 for implementing neural networks according to an example. The system 100 includes a computer system 102 and one or more computer systems 108. The computer system 102 includes conventional computing components configured to execute software that provides one or more design tools 104. Each computer system 108 implements one or more neural networks 110. The neural network(s) 110 are implemented using applications 112, acceleration libraries 114, and one or more hardware accelerators 116.

In an example, the hardware accelerator(s) 116 include programmable integrated circuits (ICs), such as field programmable gate arrays (FPGAs). The acceleration libraries 114 provide application programming interfaces (APIs) to interface with the hardware accelerator(s) 116. The acceleration libraries 114 can also include libraries that provide neural network functions, including predefined and optimized implementations of neural network layers and other types of neural network structures. Thus, the neural network(s) 110 can include both hardware portions implemented in the hardware accelerator(s) 116, as well as software portions implemented in the acceleration libraries 114. The applications 112 invoke the APIs of the acceleration libraries 114 to program and control the hardware accelerator(s) 116 to implement the neural network(s) 116.

A designer interacts with the design tool(s) 104 to define the neural network(s) 110. The design tool(s) 104 can generate files for programming the hardware accelerator(s) 116 (e.g., configuration bitstreams for FPGAs), files that provide the acceleration libraries 114, and files that provide the applications 112. The designer can define the hardware portions of the neural network(s) 110 using a register transfer language (RTL) or using a programming language, such as C, C++, OpenCL, and the like, or a combination of RTL and programmable language(s). The user can define the software portions of the neural network(s) 110 using a programming language, such as C, C++, OpenCL, etc. The design tool(s) 104 compile the software-defined neural networks to generate files for programming the hardware accelerator(s) 116 and library files for the acceleration libraries 114. The designer can make use of libraries 106 that provide class libraries, template libraries, and the like to assist in developing the hardware and software portions of the neural network(s) 110.

A user can define the applications 112 using a programming language (e.g., C, C++, Python, etc.). The user can make use of neural network frameworks and libraries, such as Caffe, TensorFlow™, MXNet, and the like.

Figure 2:
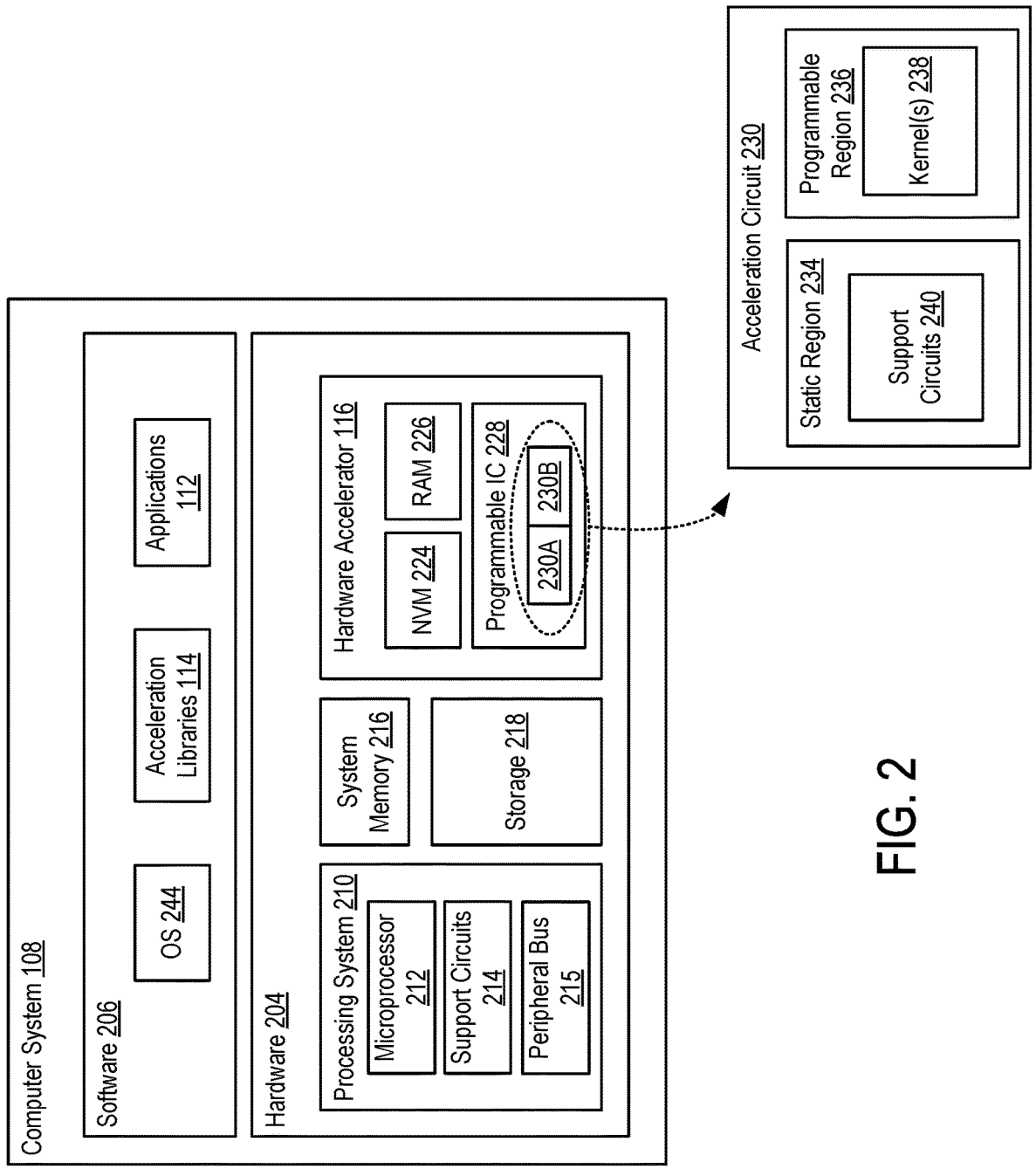
FIG. 2 is a block diagram depicting a computing system according to an example.

FIG. 2 is a block diagram depicting a computing system 108 according to an example. The computing system 108 includes hardware 204 and software 206 executing on the hardware 204. The hardware 204 includes a processing system 210, system memory 216, storage device(s) ("storage 218"), and a hardware accelerator 116. The software 206 includes an operating system (OS) 244, the acceleration libraries 114, and the applications 112. The processing system 210, system memory 216, and storage 218 comprise a host computer system as referenced herein.

The processing system 210 includes a microprocessor 212, support circuits 214, and a peripheral bus 215. The microprocessor 212 can be any type of general-purpose central processing unit (CPU), such as an x86-based processor, ARM®-based processor, or the like. The microprocessor 212 can include one or more cores and associated circuitry (e.g., cache memories, memory management units (MMUs), interrupt controllers, etc.). The microprocessor 212 is configured to execute program code that perform one or more operations described herein and which can be stored in the system memory 216 and/or the storage 218. The support circuits 214 include various devices that cooperate with the microprocessor 212 to manage data flow between the microprocessor 212, the system memory 216, the storage 218, the hardware accelerator 116, or any other peripheral device. For example, the support circuits 214 can include a chipset (e.g., a north bridge, south bridge, platform host controller, etc.), voltage regulators, firmware (e.g., a BIOS), and the like. The support circuits 214 manage data flow between the microprocessor 212 and the peripheral bus 215, to which various peripherals, such as the hardware accelerator 116, are connected. In some examples, the microprocessor 212 can be a System-in-Package (SiP), System-on-Chip (SoC), or the like, which absorbs all or a substantial portion of the functionality of the chipset (e.g., north bridge, south bridge, etc.). The peripheral bus 215 can implement an expansion bus standard, such as Peripheral Component Interconnect Express (PCIe). In the example, the processing system 210 is shown separate from the hardware accelerator 116. In other examples discussed further below, the processing system 210 and the hardware accelerator 116 can be implemented on the same integrated circuit (IC) using a System-On-Chip (SoC).

The system memory 216 is a device allowing information, such as executable instructions and data, to be stored and retrieved. The system memory 216 can include, for example, one or more random access memory (RAM) modules, such as double-data rate (DDR) dynamic RAM (DRAM). The storage device 218 includes local storage devices (e.g., one or more hard disks, flash memory modules, solid state disks, and optical disks) and/or a storage interface that enables the computing system 108 to communicate with one or more network data storage systems. The hardware 204 can include various other conventional devices and peripherals of a computing system, such as graphics cards, universal serial bus (USB) interfaces, and the like.

The hardware accelerator 116 includes a programmable IC 228, a non-volatile memory (NVM) 224, and RAM 226. The programmable IC 228 can be an FPGA or the like or an SoC having an FPGA or the like. The NVM 224 can include any type of non-volatile memory, such as flash memory or the like. The RAM 226 can include DDR DRAM or the like. The programmable IC 228 is coupled to the NVM 224 and the RAM 226. The programmable IC 228 is also coupled to the peripheral bus 215 of the processing system 210.

The OS 244 can be any commodity operating system known in the art, such as Linux®, Microsoft Windows®, Mac OS®, or the like. The acceleration libraries 114 includes drivers and libraries that provide APIs for command and control of the hardware accelerator 116. The applications 112 include software executing on the microprocessor 212 that invokes the APIs of the acceleration libraries 114 to implement neural network(s).

In operation, the programmable IC 228 is configured with an acceleration circuit 230. The acceleration circuit 230 generally includes a base platform 230A and a neural network accelerator 230B. For example, the acceleration circuit 230 can be implemented using a static region 234 and a programmable region 236. The static region 234 includes support circuits 240 for providing an interface to the peripheral bus 215, the NVM 224, and the RAM 226. The programmable region 236 can include one or more neural network accelerators ("kernel(s) 238"). The base platform 230A is implemented using the static region 234, and the neural network accelerator 230B is implemented using the programmable region 236. In another example, the base platform 230A can also be implemented using a portion of the programmable region 236. Thus, in some examples, the programmable region 236 also includes some interface circuits. In some examples, the acceleration circuit 230 can include more than one programmable region 236, each of which can be individually configured with neural network accelerator(s) 238.

The static region 234 is "static" in that the circuitry thereof remains constant across reconfigurations of the programmable region 236. In an example, the support circuits 240 include PCIe endpoint circuits, a direct memory access (DMA) controller, interconnects, a memory controller, a memory interface circuit (e.g., a DDR interface), decoupler circuits (to support partial reconfiguration), a flash programmer, debug circuits, and the like. In some examples, the programmable region 236 does not include any of the support circuits 240. In other examples, some support circuits are implemented in the programmable region 236. In such case, the programmable region 236 can be referred to as an "expanded programmable region." In either case, in one example, some support circuits 240 are always present in the static region 234, such as the PCIe circuits and the DMA circuits.

Figure 3:
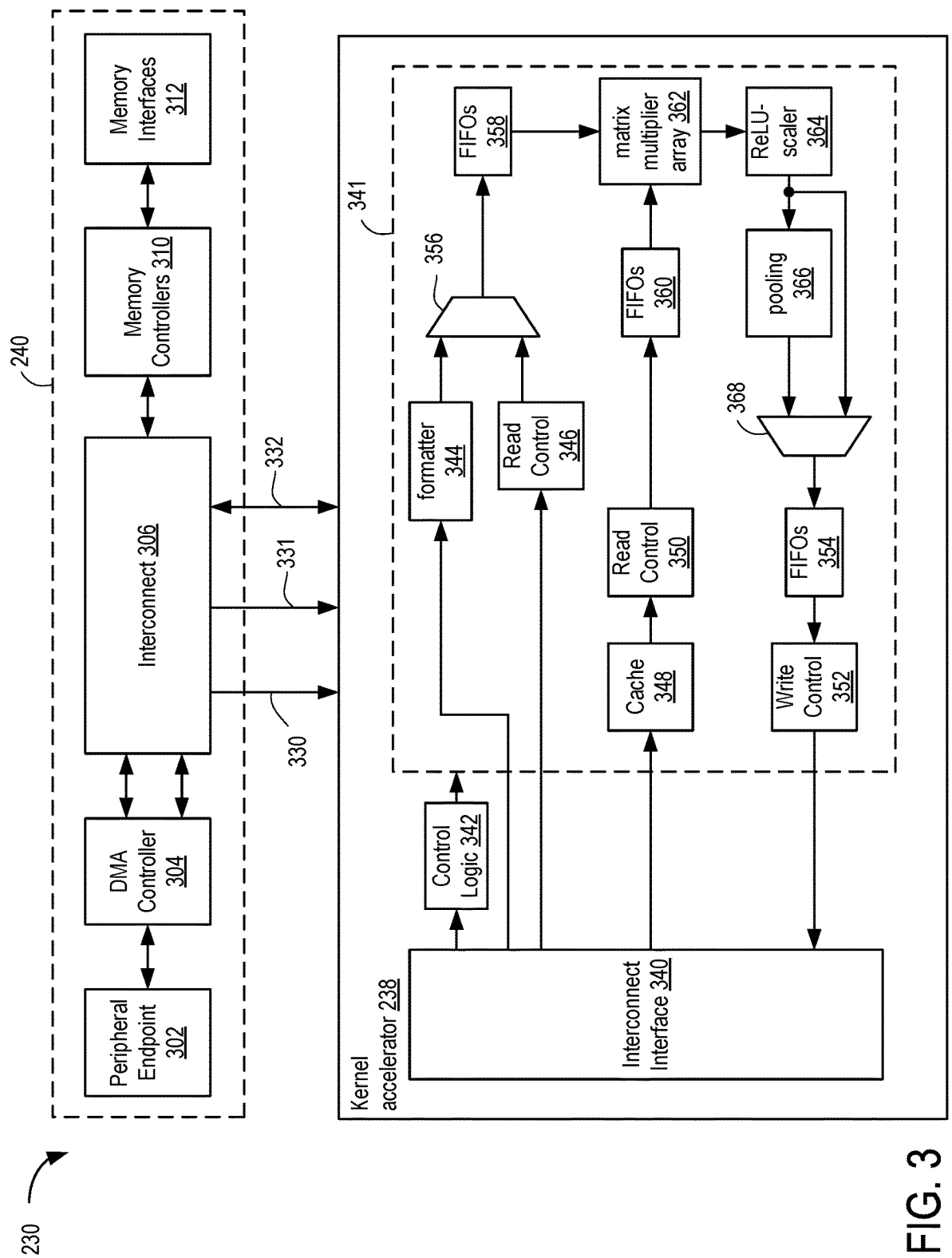
FIG. 3 is a block diagram depicting an acceleration circuit according to an example.

FIG. 3 is a block diagram depicting an acceleration circuit 230, according to an example. The acceleration circuit 230 includes the support circuits 240 and a neural network accelerator 238. In the example, the support circuits 240 include a PCIe endpoint circuit 302, a PCIe DMA controller 304, interconnect circuits 306, memory controllers 310, and memory interfaces 312. The support circuits 240 can include other circuits, which are omitted for clarity (e.g., decoupler circuits, debug circuits, etc.). The PCIe endpoint 302 provides a physical interface to the peripheral bus 215. The PCIe DMA controller 304 facilitates DMA operations to the RAM 226 and the neural network accelerator 238. The interconnect 306 couples the PCIe DMA controller 304 to the memory controllers 310 and to the neural network accelerator 238. The memory controllers 310 are coupled to the memory interfaces 312. The memory interfaces 312 are coupled to the RAM 226.

In operation, the acceleration libraries 114 can access the RAM 226 directly through the PCIe DMA controller 304. The acceleration libraries 114 can also access the neural network accelerator 238 through the PCIe DMA controller 304. The neural network accelerator 238 can access the RAM 226 through the memory controllers 310. Data can be exchanged between the software 206 and the neural network accelerator 238 using DMA operations between the system memory 216 and the RAM 226.

In the example, the neural network accelerator 238 uses interfaces 330, 331, and 332 to communicate with the interconnect 306. In particular, these interfaces include a first read interface 330, a second read interface 331, and a read/write interface 332. For example, the read interface 330 can be used as a control interface for controlling the neural network accelerator 238. The read interface 331 can be used to read from the RAM 226 through a first one of the memory interfaces 312. The read/write interface 332 can be used to read and write from the RAM 226 through a second one of the memory interfaces 312.

The neural network accelerator 238 includes an interconnect interface 340, control logic 342, and processing circuits 341. The processing circuits 341 include a formatter circuit 344 circuit (e.g., IM2COL), a read control circuit 346, a multiplexer 356, first-in-first-out circuits ("FIFOs 358"), matrix multiplier array 362, a ReLU-scaler circuit 364, a pooling circuit 366 (e.g., maxpool), a multiplexer 368, FIFOs 354, write control circuit 352, a cache 348, a read control circuit 350, and FIFOs 360. The interconnect interface 340 is coupled to the interfaces 330, 331, and 332, the control logic 342, and the processing circuits 341. The interconnect interface 340 can include switches, clock converters, and the like to facilitate communication between the control logic 342 and the interface 330, as well as between the processing circuits 341 and the interfaces 331 and 332.

In the example, the interconnect interface 340 is coupled to inputs of the formatter circuit 344, the read control circuit 346, the cache 348, and the write control circuit 352. Outputs of the formatter circuit 344 and the read control circuit 346 are coupled to inputs of the multiplexer 356. An output of the multiplexer 356 is coupled to an input of the FIFOs 358. An output of the FIFOs 358 is coupled to a first input of the matrix multiplier array 362. An output of the cache 348 is coupled to an input of the read control circuit 350. An output of the read control circuit 350 is coupled to an input of the FIFOs 360. An output of the FIFOs 360 is coupled to a second input of the matrix multiplier array 362. An output of the matrix multiplier array 362 is coupled to an input of the ReLU-scaler 364. An output of the ReLU-scaler 364 is coupled to an input of the pooling circuit 366 and an input of the multiplexer 368. An output of the pooling circuit 366 is coupled to another input of the multiplexer 368. An output of the multiplexer 368 is coupled to an input of the FIFOs 354. An output of the FIFOs 354 is coupled to the write control circuit 352.

In operation, the matrix multiplier array 362 performs matrix multiplication operations for implementing a neural network. The inputs of the matrix multiplier array 362 receive input activation matrices from the FIFOs 358 and weight matrices from the FIFOs 360. The input activation matrices can be read directly from the RAM 226 using the read control circuit 346. Alternatively, the input activations can be read from the RAM 226 and processed by the formatter circuit 344 for input to the matrix multiplier array 362. Weight matrices can be read from the RAM 226 by the read control circuit 350 and cached in cache 348. The ReLU-scaler 364 performs and activation function and can scale the output of the matrix multiplier array 362. The pooling circuit 366 can implement a max pooling function on the scaled output of the matrix multiplier array 362. In one example, the pooling circuit 366 is implemented using CLBs or other configurable logic. Either the output of the pooling circuit 366 or the ReLU-scaler 364 can be stored in the FIFOs 354. The write control circuit 352 writes data in the FIFOs to the RAM 226. The control logic 342 controls the various circuits in the processing circuits 341, such as the formatter circuit 344, the read control circuit 346, the multiplexers 356 and 368, the read control circuit 350, and the ReLU-scaler 364, the pooling circuit 366, and the write control circuit 352.

Figure 4:
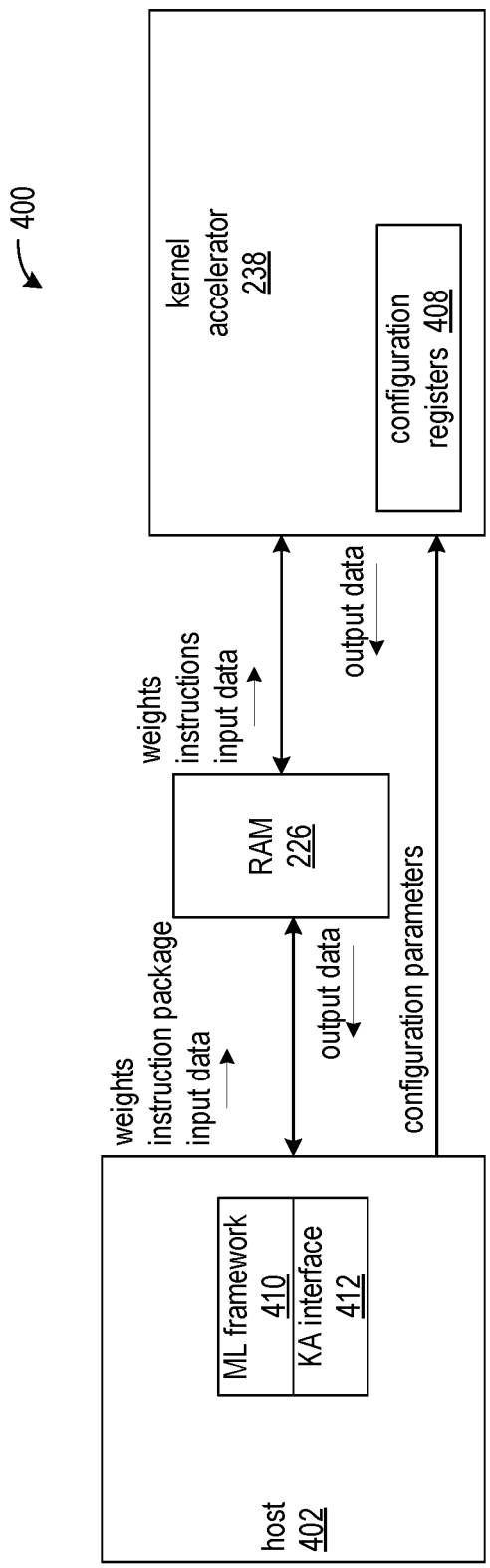
FIG. 4 shows an exemplary neural network processing system according to one implementation.

FIG. 4 shows an exemplary neural network processing system 400 according to one implementation. The system includes a host computer system 402 communicatively coupled to neural network accelerator 238. The host computer system 402 can include the processing system 210, system memory 216, and storage 218 as shown in FIG. 2. The host computer system 402 is specifically programmed by a machine learning (ML) framework 410 and a neural network accelerator (KA) interface 412. The ML framework program, which corresponds to the applications 112 of FIG. 1, specifies a particular neural network application, for example, image or speech processing, and the KA interface, which can be implemented as acceleration libraries as in FIG. 1, initiates neural network operations on the neural network accelerators 238 in response to requests for neural network processing from the ML framework. The neural network accelerator 238 is coupled to RAM 226, through which the host and neural network accelerator communicate. The neural network accelerator has a set of configuration registers 408. The configuration registers are accessible to the KA interface 412 for storing addresses of memory buffers in the RAM 226 and configuration parameters for neural network operations, such as matrix dimensions for general matrix multiplication (GEMM) and the stride/window for convolution.

The KA interface 412 operates as two processor elements executing on the host 402. The first processor element initiates operations with the neural network accelerator, and the second processor element completes neural network processing using the output data from the neural network accelerator. The first and second processor elements and the neural network accelerator operate from a shared memory queue (not shown) in the RAM 226. The first processor element inputs data to be processed to the neural network accelerator, the neural network accelerator performs specified neural network operations on the input data and stores the output data in the shared memory queue, the first processor element signals to the second processor element that the shared memory queue is full of processed data, the second processor element reads the processed data from the shared memory queue and thereafter signals to the first processor element that the shared queue is empty. Once the first processor element receives the signal that the shared memory queue is empty, the first processor element can input another data set to the neural network accelerator. While the neural network accelerator is processing the next input data set, the second processor element performs the remaining neural network operations on the processed data that resulted from the previous input data set.

The disclosed approaches are not limited to any specific hardware platforms. However, for purposes of providing a frame of reference to those skilled in the art, the neural network accelerator can be implemented on a KINTEX® ULTRASCALE™ 115 device, which is available from Xilinx, Inc. The RAM 226 is a DDR SDRAM mounted on a printed circuit board along with the neural network accelerator, and the RAM can include multiple RAM devices, such as one RAM for inputting data to the neural network accelerator and another RAM for storing output data from the neural network accelerator. The interface between host 402 and the RAM, and between the host and the neural network accelerator is Peripheral Component Interconnect Express (PCIE). The neural network accelerator uses direct memory access (DMA) channels to map some of the host memory to the RAM and to configuration registers 408. The host computer system 402 can be any computer system or combination or network of computer systems suitable for executing an ML framework 410 and KA interface 412. ML frameworks can be specified using programming packages such as TensorFlow™, Caffe, and MXNet.

The KA interface 412 receives neural network requests from the ML framework 410 for processing by the neural network accelerator 238. Prior to submitting neural network requests to the neural network accelerator for processing, the KA interface writes the weight matrices associated with the layers of the neural network to the RAM 226 that is shared with the neural network accelerator. All of the weight matrices are written to the shared memory as a contiguous block, which reduces the number of DMA operations and overhead and ensures that the weights are available to the neural network accelerator when the weights are needed for the convolutions or matrix multiplications in the layers of the neural network.

In response to receiving a neural network request from the ML framework 410, the KA interface 412 assembles a group of per-layer instructions into an instruction package and writes the instruction package to the RAM 226. Each per-layer instruction specifies processing of a respective layer of the neural network. In addition, each per-layer instruction specifies a respective offset of a weight matrix from the base address of the combined weight matrices in a shared memory. The processing of each layer of the neural network will access a respective one of the weight matrices. The per-layer instructions also specify configuration parameters for different neural network operations in different layers. For example, the configuration parameters can specify a scaling factor, convolution window and stride, matrix dimensions for maxpool processing, and an activation function. The configuration parameters further include the base address of the instruction package in the RAM. Different layers of the neural network can entail different sets of neural network operations.

The KA interface 412 further establishes configuration parameters in the configuration registers 408 of the neural network accelerator 238. The configuration parameters include the base address of the weight matrices, the base address of the input/output data matrices, and an offset from the base address of the input/output data matrices. A weight matrix is sometimes referred to as "A," an input data matrix is sometimes referred to as "B," and the output data matrix is sometimes referred to as "C."

In response to a signal from the KA interface 412 indicating that a package of instructions is ready to be processed, the neural network accelerator 238 serially processes the per-layer instructions from the instruction package. The package of instructions effectively specifies a program or a state machine according to which the neural network accelerator performs the specified processing of the layers of the neural network.

Figure 5:
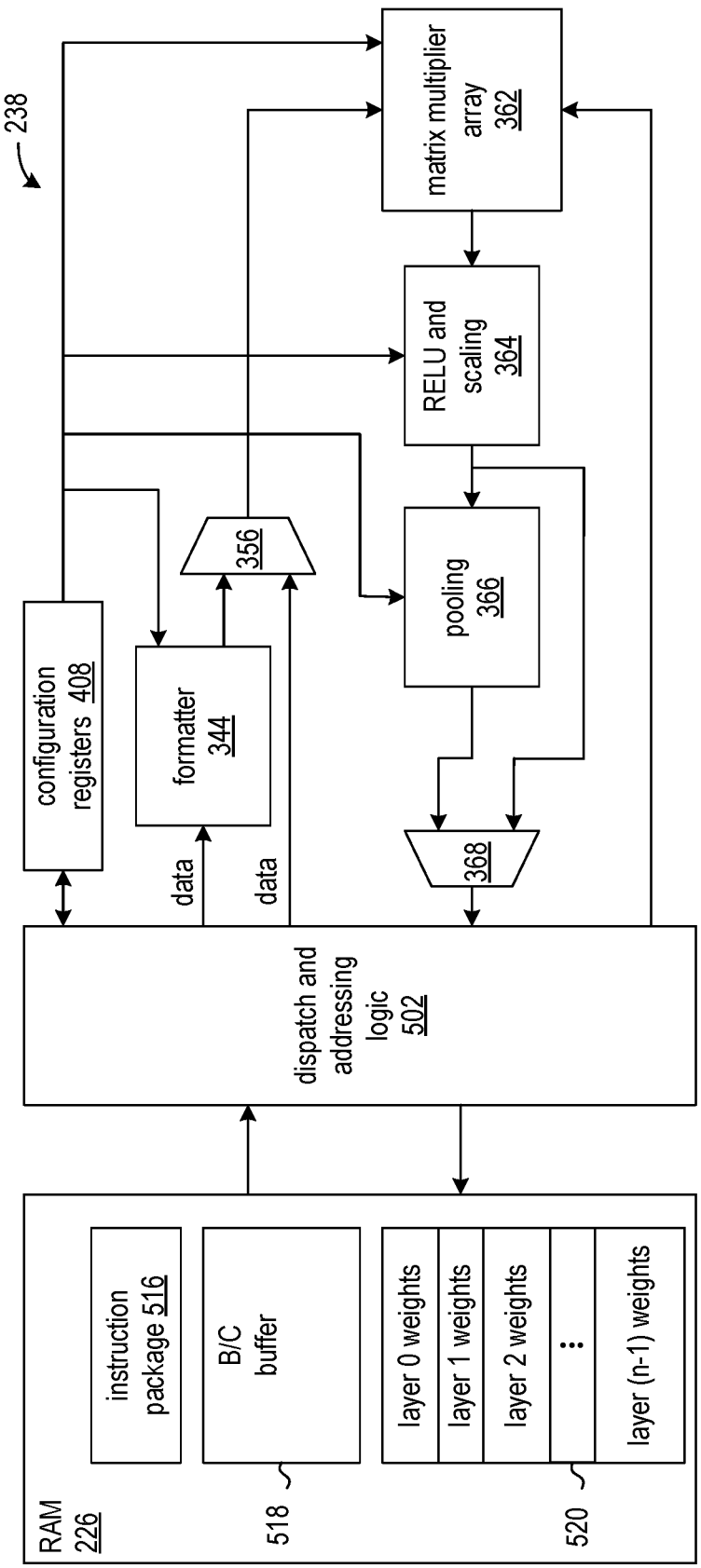
FIG. 5 shows another view of the exemplary neural network accelerator shown in FIG. 3.

FIG. 5 shows another view of the exemplary neural network accelerator 238 of FIG. 3. The merged weight matrices 520 are written by the host and stored in contiguous addresses of the RAM 226. In an exemplary application, the per-layer instructions in the instruction package 516 specify sets of neural network operations to be performed in the layers of the neural network and configuration parameters for scaling, maxpool dimensions, and an activation function. Different sets of neural network operations can be specified in different ones of the per-layer instructions in the instruction package to direct specific per-layer processing by the neural network accelerator.

In processing the per-layer instructions from the instruction package 516, the neural network accelerator processes the instructions serially. For example, a first per-layer instruction is processed followed in succession by processing a second per-layer instruction of the instruction package. In processing the first per-layer instruction, the neural network accelerator 238 reads input data from a first portion of the B/C buffer 518 in the RAM 226 and writes output data to a second portion of the B/C buffer in the RAM. In processing the second per-layer instruction, the neural network accelerator reads input data from the second portion of the B/C buffer and writes the output data to the first portion of the B/C buffer. The neural network accelerator thereafter alternates between portions of the B/C buffer used for input and output data with each successive per-layer instruction.

The neural network accelerator 238 includes configuration registers 408, dispatching and addressing logic circuitry 502 (that implement the read and write controls of FIG. 3), formatter circuit 344, convolution or matrix multiplier circuitry 362, rectifier liner unit (ReLU) and scaling circuit 364, and pooling circuitry 366. Multiplexers 356 and 368 are controlled by the dispatch and addressing logic according to the specified neural network operations. The configuration data in the configuration registers provide configuration parameters for the formatter circuit, matrix multiplier circuitry, ReLU-scaling circuit, and pooling circuitry.

The dispatch and addressing circuit 502 reads a per-layer instruction from the instruction package 516 and initiates the specified neural network operations with the data referenced in the work request. The dispatch and addressing circuit controls multiplexer 356 to select between input data read from the RAM 226 and formatted data from formatter circuit 344, according to the parameters specified in the per-layer instruction. The formatter circuit 344 translates input data from a format provided by the ML framework to a format suitable for the convolution or matrix multiplier circuit 362. For example, in one implementation, the formatter circuit converts image data into column data (im2col). In another implementation, the formatter circuit translates row-major or column-major format to a custom hybrid row/column major format that matches the compute array geometry. The convolution or matrix multiplier circuitry 362 performs matrix multiplication between the input data and a selected weight matrix from the weight matrices 520. In one implementation, the matrix multiplication circuit 362 is a systolic array of multiplier-accumulator circuits. ReLU circuit 364 implements an activation function and a scaling function for the neural network. In an exemplary application, the pooling circuit 366 reduces the spatial size of the data between convolution layers in order to reduce the computational requirements imposed on succeeding layers. Reduction of the spatial size also aids in avoiding overfitting. In an exemplary application, the pooling circuit implements the maxpool function. The dispatch and addressing circuit controls multiplexer 368 to select between data from the ReLU and scaling circuit 364 and data from the pooling circuit 366 for storing as the output matrix in the B/C buffer 518.

Figure 6:
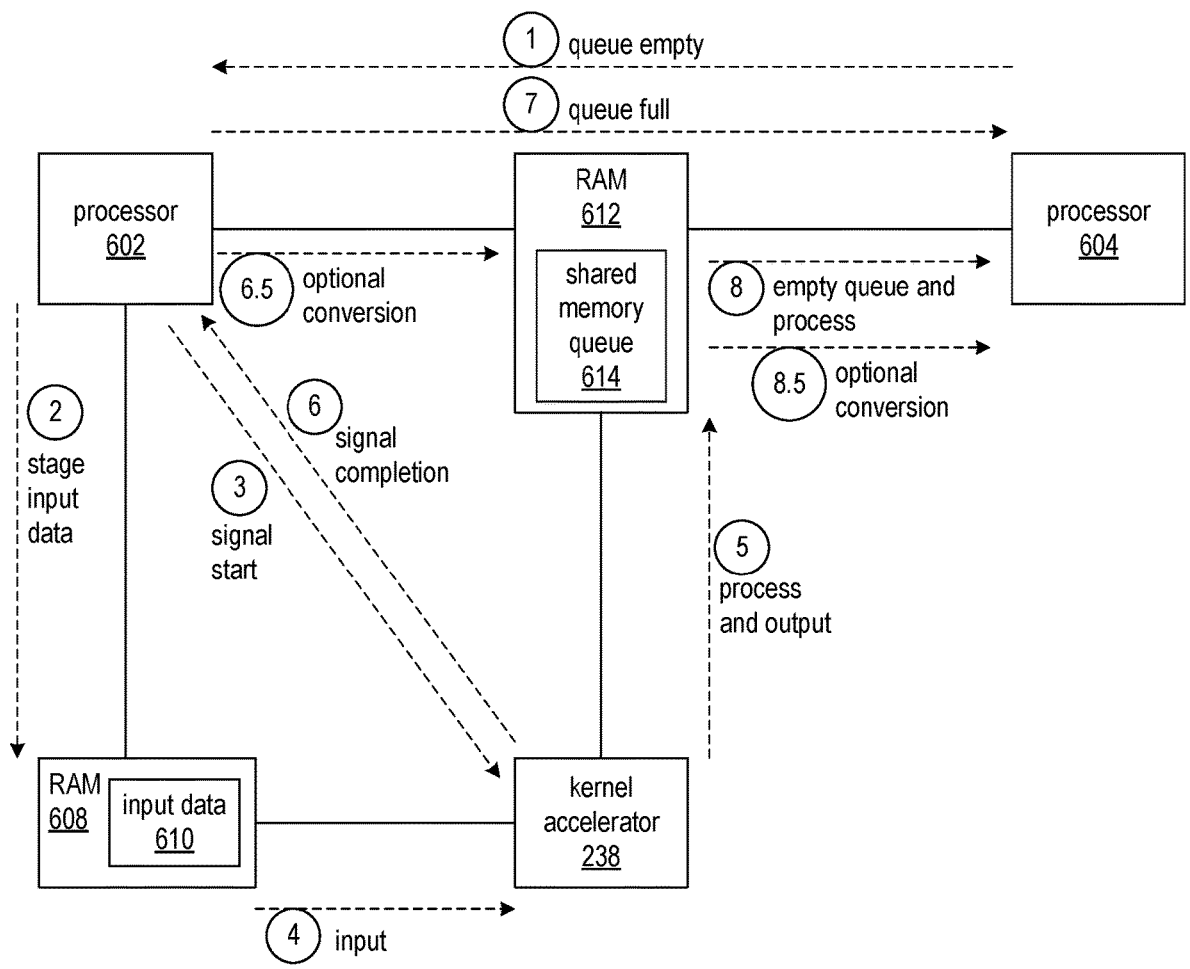
FIG. 6 shows a neural network processing system, along with data flow and control signaling between a first processor element, a neural network accelerator, and a second processor element.

FIG. 6 shows a neural network processing system, along with data flow and control signaling between a first processor element 602, a neural network accelerator 238, and a second processor element 604. The numbered circles indicate the order in which the functions and control are exercised in the system, and the dashed lines represent the flow of data and control signals. When the first processor element 602 receives a queue-empty signal (1) from the second processor element 604, the first processor element can proceed in staging (2) an input data set 610 to the RAM 608 for processing by the neural network accelerator 238. Once the first processor element has written the input data set to the RAM, the first processor element signals (3) to the neural network accelerator to commence performing the specified neural network operations on the input data set.

The neural network accelerator reads (4) the input data set 610 from the RAM 608 and performs the specified subset of neural network operations. In an exemplary implementation of a convolutional neural network, the neural network accelerator performs the operations of convolutional layers, ReLU, and max-pooling layers. The neural network accelerator can also perform the operations of the fully-connected layers. However, for improved performance, the second processor element 604 performs the operations of the fully-connected layers. The neural network accelerator stores the output data in the shared memory queue 614 in the RAM 612 and when processing is complete signals (6) completion to the first processor element 602. The output data from the neural network accelerator can be viewed as an intermediate data set in implementations in which the second processor element 604 further processes the output data. The RAMs 608 and 612 can be a single RAM 226 such as shown in FIG. 5 or physically separate RAMs, depending on implementation requirements.

In some implementations, the total processing of the layers of the neural network can be equalized between the first processor element and the second processor element through user configuration of which of the first processor element or the second processor element will perform data conversion of output data from the neural network accelerator. Idling by the neural network accelerator can be minimized by equalizing the processing between the first and second processor elements. The utilization of the neural network accelerator increases as the processing of the host and the neural network accelerator move toward being equal. The data conversion is a consequence of the neural network accelerator performing neural network operations more efficiently when the data format is different from the data format in which the host receives input data. The data format conversion is performed because the host data format follows the established ML framework formats (e.g., row major in MXNet) while the neural network accelerator can use a custom format to maximize performance. For example, the neural network accelerator can use column major format, image row format, or another format based on the architecture of the neural network accelerator and its matrix multiplier.

If the user configured the first processor element 602 to perform data conversion, the first processor element converts (6.5) the output data in the shared memory queue 614 and then signals (7) the second processor element 604 that the queue is full. In response to receiving the queue-full signal from the first processor element, the second processor element copies (8) the contents of the shared memory queue to another workspace in the RAM 612, and then signals (1) the first processor element that the shared memory queue is empty. Once the second processor element signals that the shared memory queue is empty, the first processor element can input another data set to the neural network accelerator for processing while the second processor element is performing the operations of the designated subset of layers of the neural network on the output data generated by the neural network accelerator for the previous input data set. If the user configured the second processor element to perform data conversion, the second processor element converts (8.5) the output data that was copied from the shared memory queue. In an implementation of a convolutional neural network, the second processor element performs operations of the softmax layer. However, it will be recognized that the second processor element can be programmed to perform operations of any layer (e.g., ReLU and max-pool) not implemented by the neural network accelerator.

Figure 7:
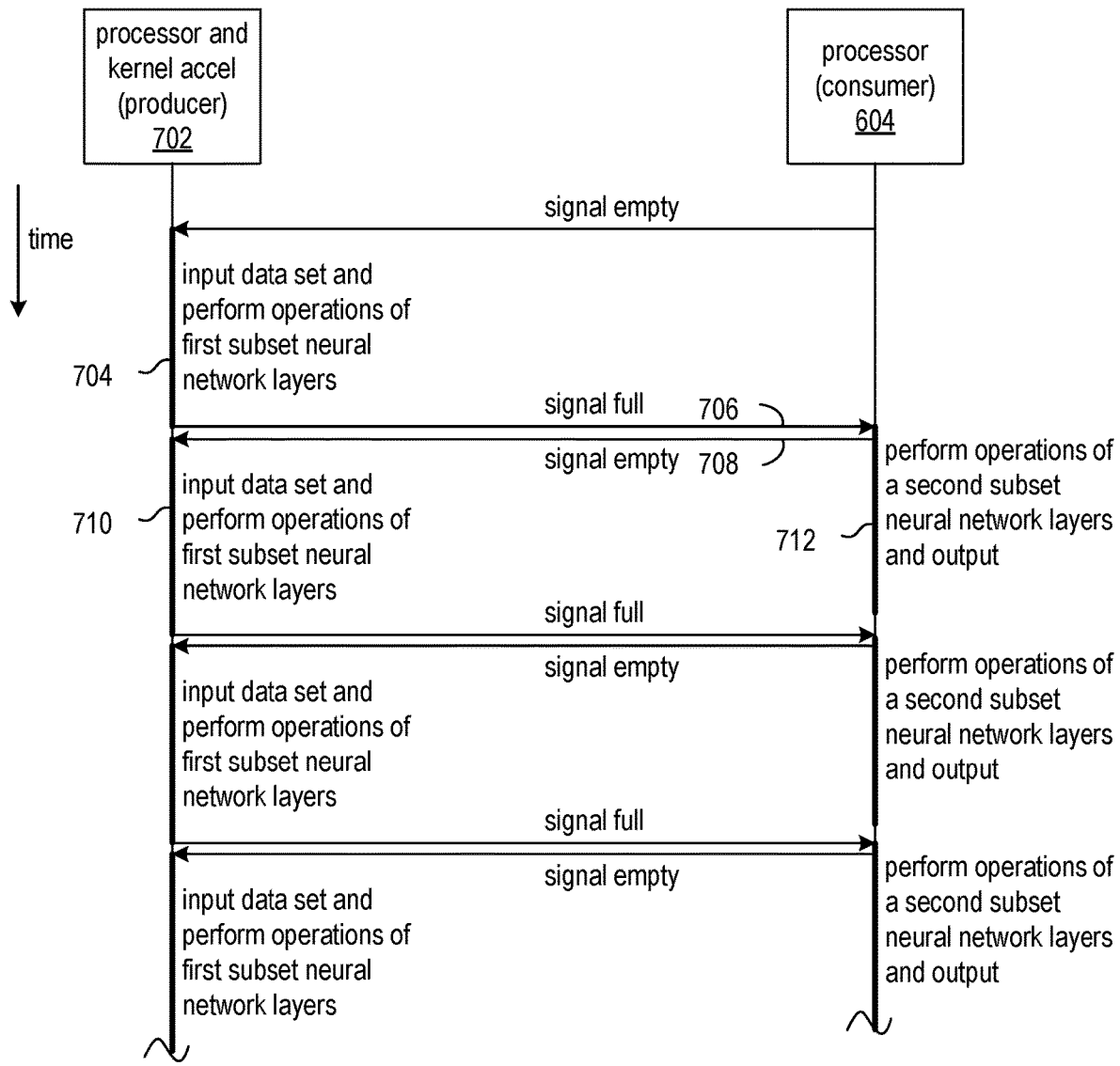
FIG. 7 shows the parallel and pipelined processing of input data sets by the producer components and the consumer processor.

FIG. 7 shows the parallel and pipelined processing of input data sets by the producer components 702 (processor element 602 and neural network accelerator 238) and the consumer processor 604. As explained above, the second/consumer processor signals the first/producer processor when the shared memory queue is empty, and the first processor element signals the second processor element when the shared memory queue is full. The first processor element can initiate processing of an input data set when the shared memory queue is empty, and the second processor element can initiate processing of the output data from the neural network accelerator when the shared memory queue is full. The thick line segments that overlay the thin lines represent active processing by the associated components, and the thin lines represent the passage of time.

In response to an input data set and the second processor element 604 signaling that the shared memory queue is empty, the first processor element inputs a first data set to the neural network accelerator, and the neural network accelerator performs the operations of a subset of the layers of the neural network, as represented by line segment 704. When the neural network accelerator and first processor element have completed processing of the input data set, the first processor element signals to the second processor element that the shared memory queue is full, as shown by line 706. In response to the full signal, the second processor element immediately copies the output data from the shared memory queue to another memory workspace and after copying the data signals the first processor element that the queue is empty, as shown by line 708.

In response to the queue-empty signal and availability of the next data set, the first processor element inputs the next data set to the neural network accelerator, and the neural network accelerator performs the operations of a subset of the layers of the neural network, as represented by line segment 710. While the neural network accelerator processes the next input data set, the second processor element in parallel performs the operations of another subset of layers of the neural network on the output data resulting from the first input data set as shown by line segment 712. That is, in parallel with the first processor element and neural network accelerator processing input data set N, the second processor element processes the output data resulting from the processing of input data set N−1 by the neural network accelerator, where order of input data sets is N−1, N, N+1 etc.

Figures 8, 9:
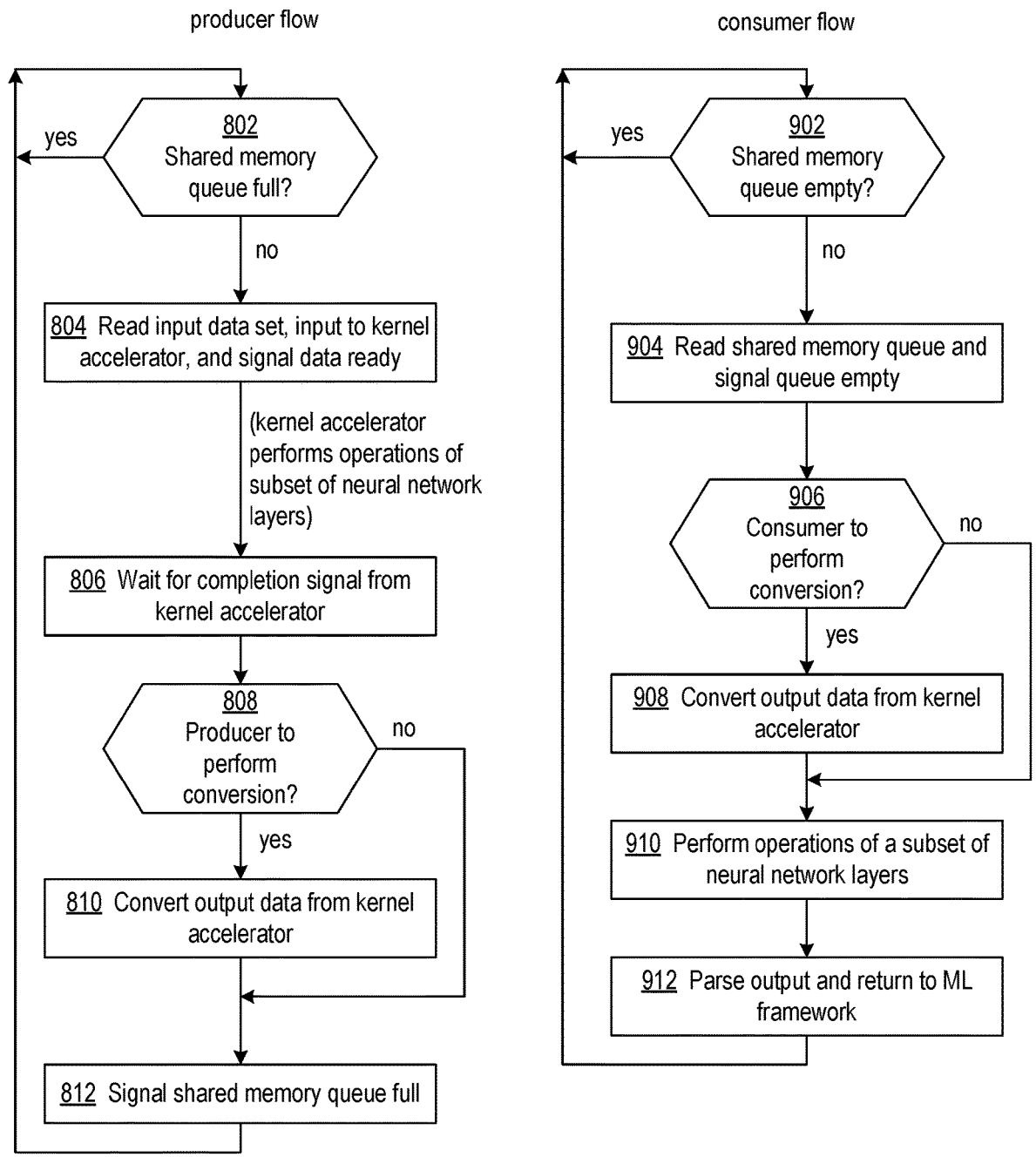
FIG. 8 shows a flowchart of a process performed by a first processor element and a neural network accelerator, which together operate as a producer in a neural network processing system.
FIG. 9 shows a flowchart of a process performed by the second processor element, which operates as a consumer in the neural network processing system.

FIG. 8 shows a flowchart of a process performed by a first processor element and a neural network accelerator, which together operate as a producer in a neural network processing system. At decision block 802, the first processor element waits until the shared memory queue is empty, as indicated by an empty signal from the second processor element, before continuing. In response to the second processor element signaling that the shared memory queue is empty, the first processor element proceeds to block 804 and reads an input data set and writes the input data set to a memory shared with the neural network accelerator. The first processor element signals the neural network accelerator when the input data set is available for processing, and at block 806 waits for the neural network accelerator to signal completion.

Decision block 808 checks whether the user configured the first processor element to perform data conversion. The user can configure either the first processor element or the second processor element to perform data conversion, such as by inputting a parameter value at system start-up or during system runtime. If the user designated the first processor element to perform data conversion, at block 810 the first processor element converts the output data in the shared memory queue, and after the conversion signals the second processor element that the queue is full at block 812. If the user designated the second processor element to perform data conversion, the first processor element skips block 810. The first processor element returns to block 802 to wait for the second processor element to empty the shared memory queue.

FIG. 9 shows a flowchart of a process performed by the second processor element, which operates as a consumer in the neural network processing system. At decision block 902, the second processor element waits until the shared memory queue is full, as indicated by a full signal from the first processor element, before continuing. In response to the first processor element signaling that the shared memory queue is full, the second processor element proceeds to block 904 and copies the data from the shared memory queue to a separate memory workspace. After copying the data, the second process signals the first process that the shared memory queue is empty.

Decision block 906 checks whether the user configured the second processor element to perform data conversion. If the user designated the second processor element to perform data conversion, at block 908 the second processor element converts the output data in the separate workspace to the desired format. If the user designated the first processor element to perform data conversion, the second process skips the processing of block 908.

At bock 910, the second processor element performs the operations of a subset of layers of the neural network. In an example implementation, the subset of layers assigned to the second processor element include the fully-connected layers and the softmax layer.

At block 912, the second processor element parses the output data and returns the parsed data to the ML framework. For example, the second processor element can parse the output data and translate the output data into human-readable form.

Figure 10:
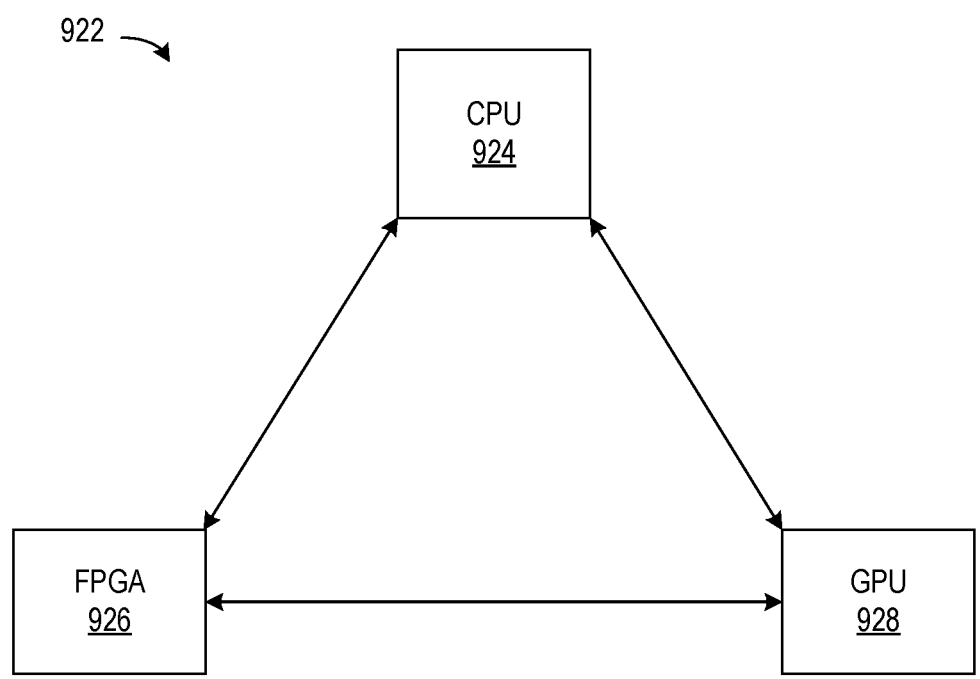
FIG. 10 shows a neural network processing system in accordance with another exemplary implementation.

FIG. 10 shows a neural network processing system 922 having a heterogeneous cluster of processing circuitry in accordance with another exemplary implementation. The system 922 includes a CPU and field programmable gate array (FPGA) circuitry 926 and graphics processing unit (GPU) 928 operating as neural network accelerators. The CPU handles data preparation, control operations with branching, memory-bound operations not worthy of sending off to accelerator. The FPGA handles compute-intensive jobs that would also benefit from a custom memory hierarchy. The GPU handles large, compute-intensive tasks.

The FPGA circuitry 926 is beneficial as a neural network accelerator for a neural network in which the computation is distributed into many layers, and the computational requirements of each layer are insufficient to keep the GPU 928 well utilized. Custom, on-chip memory can help to ensure data locality when transitioning between small layers and thereby significantly accelerate computations.

The GPU 928 is beneficial as a neural network accelerator for a neural network in which the each layers computational requirements would keep the GPU busy and less reliant on data transfers between memory and processor elements of the GPU.

Figure 11:
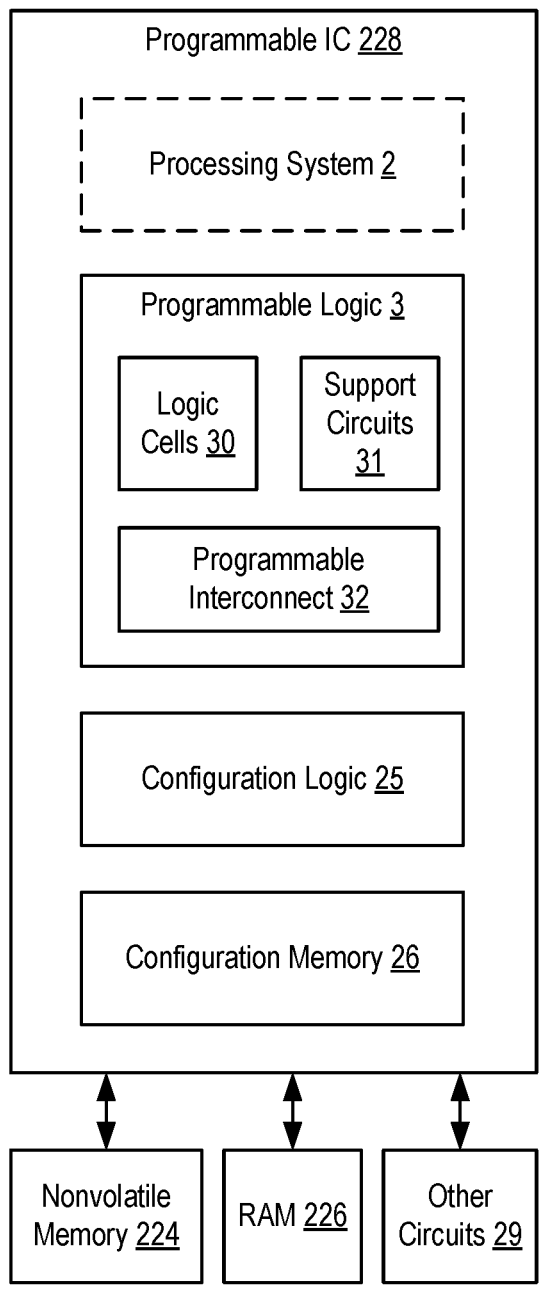
FIG. 11 is a block diagram depicting a programmable IC according to an example.

FIG. 11 is a block diagram depicting a programmable IC 228 according to an example. The programmable IC 228 includes programmable logic 3, configuration logic 25, and configuration memory 26. The programmable IC 228 can be coupled to external circuits, such as the NVM 224, the RAM 226, and other circuits 29. The programmable logic 3 includes logic cells 30, support circuits 31, and programmable interconnect 32. The logic cells 30 include circuits that can be configured to implement general logic functions of a plurality of inputs. The support circuits 31 include dedicated circuits, such as transceivers, input/output blocks, digital signal processors, memories, and the like. The logic cells 30 and the support circuits 31 can be interconnected using the programmable interconnect 32. Information for programming the logic cells 30, for setting parameters of the support circuits 31, and for programming the programmable interconnect 32 is stored in the configuration memory 26 by the configuration logic 25. The configuration logic 25 can obtain the configuration data from the nonvolatile memory 224 or any other source (e.g., the DRAM 226 or from the other circuits 29). In some examples, the programmable IC 228 includes a processing system 2. The processing system 2 can include microprocessor(s), memory, support circuits, IO circuits, and the like. For example, the processing system 2 can include circuits similar to the processing system 210. In some examples, the processing system 2 can be used in place of the processing system 210 of FIG. 2. In such case, the entire computing system 108 of FIG. 2 can be implemented using the programmable IC 228, where the software 206 executes on the processing system 2.

Figure 12:
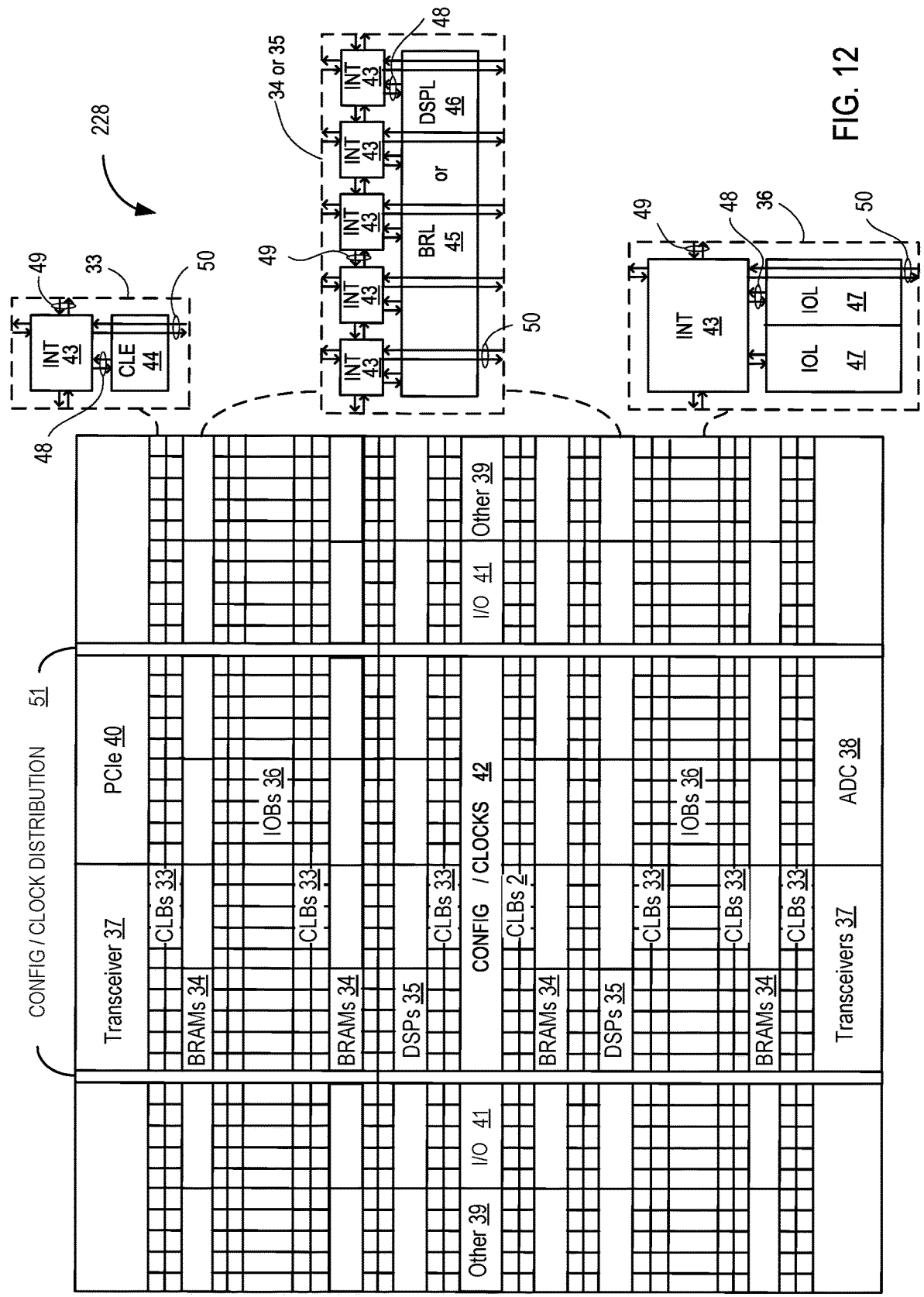
FIG. 12 illustrates an FPGA implementation of a programmable IC.

FIG. 12 illustrates an FPGA implementation of the programmable IC 228 that includes a large number of different programmable tiles including transceivers 37, configurable logic blocks ("CLBs") 33, random access memory blocks ("BRAMs") 34, input/output blocks ("IOBs") 36, configuration and clocking logic ("CONFIG/CLOCKS") 42, digital signal processing blocks ("DSPs") 35, specialized input/output blocks ("I/O") 41 (e.g., configuration ports and clock ports), and other programmable logic 39 such as digital clock managers, analog-to-digital converters, system monitoring logic, and so forth. The FPGA can also include PCIe interfaces 40, analog-to-digital converters (ADC) 38, and the like.

In some FPGAs, each programmable tile can include at least one programmable interconnect element ("INT") 43 having connections to input and output terminals 48 of a programmable logic element within the same tile, as shown by examples included at the top of FIG. 12. Each programmable interconnect element 43 can also include connections to interconnect segments 49 of adjacent programmable interconnect element(s) in the same tile or other tiles. Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated FPGA.

In an example implementation, a CLB 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 35 can include a DSP logic element ("DSPL") 46 in addition to an appropriate number of programmable interconnect elements. An IOB 36 can include, for example, two instances of an input/output logic element ("IOL") 47 in addition to one instance of the programmable interconnect element 43. As will be clear to those of skill in the art, the actual I/O pads connected, for example, to the I/O logic element 47 typically are not confined to the area of the input/output logic element 47.

In the pictured example, a horizontal area near the center of the die is used for configuration, clock, and other control logic. Vertical columns 51 extending from this horizontal area or column are used to distribute the clocks and configuration signals across the breadth of the FPGA.

Some FPGAs utilizing the architecture illustrated in FIG. 12 include additional logic blocks that disrupt the regular columnar structure making up a large part of the FPGA. The additional logic blocks can be programmable blocks and/or dedicated logic.

Note that FIG. 12 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 12 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Those skilled in the art will appreciate that various alternative computing arrangements, including one or more processors and a memory arrangement configured with program code, would be suitable for hosting the processes and data structures disclosed herein. In addition, the processes may be provided via a variety of computer-readable storage media or delivery channels such as magnetic or optical disks or tapes, electronic storage devices, or as application services over a network.

Though aspects and features may in some cases be described in individual figures, it will be appreciated that features from one figure can be combined with features of another figure even though the combination is not explicitly shown or explicitly described as a combination.

The methods and system are thought to be applicable to a variety of neural network processing systems. Other aspects and features will be apparent to those skilled in the art from consideration of the specification. It is intended that the specification and drawings be considered as examples only, with a true scope of the invention being indicated by the following claims.

What is claimed is:

1. A neural network processing system, comprising:
a shared memory;
at least one neural network accelerator coupled to the shared memory and configured to perform operations of a first subset of layers of a neural network on an input data set, generate an intermediate data set in performing the operations of the first subset of layers, and store the intermediate data set in a shared memory queue in the shared memory;
a host computer system coupled to the shared memory and having first and second processor elements, wherein:
the first processor element is configured to execute instructions that cause the first processor element to perform operations including:
providing the input data set to the at least one neural network accelerator;
signaling the at least one neural network accelerator to perform the operations of the first subset of layers of the neural network on the input data set;
determining whether a system start-up or runtime parameter configures the first processor element to convert the intermediate data set;
converting, in response to the system start-up or runtime parameter configuring the first processor element, the intermediate data set in the shared memory queue from a first format to a second format;
providing a next input data set to the neural network accelerator in response to the shared memory queue being empty; and
the second processor element is configured to execute instructions that cause the second processor element to perform operations including:
determining whether a system start-up or runtime parameter configures the second processor element to convert the intermediate data set;
converting, in response to the system start-up or runtime parameter configuring second processor element, the intermediate data set in the shared memory queue from the first format to the second format;
reading the intermediate data set from the shared memory queue; and
performing operations of a second subset of layers of the neural network on the intermediate data set that resulted from a previous input data set and generating an output data set in parallel with the neural network accelerator performing the operations of the first subset of layers of the neural network on the next input data set.

2. The neural network processing system of claim 1, wherein:
the instructions that cause the second processor element to read the intermediate data set from the shared memory queue include instructions that cause the second processor element to signal the first processor element that the shared memory queue is empty after the reading.

3. The neural network processing system of claim 2, wherein:
the first processor element is further configured to execute instructions that cause the first processor element to signal the second processor element that the shared memory queue is full when the at least one neural network accelerator has completed performing the first subset of layers of the neural network on the input data; and the second processor element is configured to execute instructions that cause the second processor element to read the intermediate data set from the shared memory queue in response to the signal from the first processor element.

4. The neural network processing system of claim 1, wherein the neural network is a convolutional neural network.

5. The neural network processing system of claim 4, wherein the first subset of layers includes convolutional layers and max-pooling layers, and the second subset of layers includes fully connected layers.

6. The neural network processing system of claim 5, wherein the second subset of layers includes a softmax layer.

7. The neural network processing system of claim 1, wherein the at least one neural network accelerator includes a field programmable gate array and a graphics processing unit.

8. A method, comprising:
providing an input data set to a neural network accelerator by a first processor element of a host computer system;
signaling by the first processor element, the neural network accelerator to perform operations of a first subset of layers of a neural network on the input data set;
performing the operations of the first subset of layers of the neural network on the input data set by the neural network accelerator;
generating an intermediate data set by the neural network accelerator in performing the operations of the first subset of layers;
storing the intermediate data set in a shared memory queue in a shared memory by the neural network accelerator;
determining by the first processor element whether a system start-up or runtime parameter configures the first processor element to convert the intermediate data;
converting, in response to the system start-up or runtime parameter configuring the first processor element, the intermediate data set in the shared memory queue from a first format to a second format by the first processor element;
determining by a second processor element whether a system start-up or runtime parameter configures the second processor element to convert the intermediate data;
converting, in response to the system start-up or runtime parameter configuring the second processor element, the intermediate data set in the shared memory queue from the first format to the second format by the second processor element;
reading the intermediate data set from the shared memory queue by the second processor element of the host computer system;
performing operations of a second subset of layers of the neural network on the intermediate data set by the second processor element, while the neural network accelerator is performing the operations of the first subset of layers of the neural network on another input data set;
inputting a next input data set by the first processor element to the neural network accelerator in response to the shared memory queue being empty, and in parallel with the neural network accelerator processing the next input data set, performing the operations of the second subset of layers by the second processor element on the intermediate data set that resulted from a previous input data set; and
generating an output data set by the second processor element.

9. The method of claim 8, wherein the reading the intermediate data set from the shared memory queue includes signaling the first processor element that the shared memory queue is empty after the reading.

10. The method of claim 9, further comprising:
signaling the second processor element by the first processor element that the shared memory queue is full when the neural network accelerator has completed performing the first subset of layers of the neural network on the input data; and
reading the intermediate data set from the shared memory queue by the second processor element in response to the signal from the first processor element.

11. The method of claim 8, wherein the neural network is a convolutional neural network.

12. The method of claim 11, wherein the first subset of layers includes convolutional layers and max-pooling layers, and the second subset of layers includes fully connected layers.

13. A system, comprising:
a host computer system configured with software that when executed causes:
a first processor element of the host computer system to perform operations including:
providing an input data set to a neural network accelerator;
signaling the neural network accelerator to perform operations of a first subset of layers of a neural network on the input data set and generate an intermediate data set in a first format for storage in a shared memory queue of a shared memory;
determining whether a system start-up or runtime parameter configures the first processor element to convert the intermediate data set;
converting, in response to the system start-up or runtime parameter configuring the first processor element, the intermediate data set in the shared memory queue from the first format to a second format;
providing a next input data set to the neural network accelerator in response to the shared memory queue being empty; and
a second processor element of the host computer system to perform operations including:
determining whether a system start-up or runtime parameter configures the second processor element to convert the intermediate data set;
reading the intermediate data set from the shared memory queue;
converting, in response to the system start-up or runtime parameter configuring second processor element, the intermediate data set in the shared memory queue from the first format to the second format; and
performing operations of a second subset of layers of the neural network on the intermediate data set that resulted from a previous input data set and generating an output data set in parallel with the neural network accelerator performing the operations of the first subset of layers of the neural network on the next input data set.

14. The system of claim 13, wherein the host computer system is configured with software that when executed causes the second processor element to signal the first processor element that the shared memory queue is empty after the reading.

15. The system of claim 14, wherein the host computer system is configured with software that when executed causes:
- the first processor element to signal the second processor element that the shared memory queue is full when the at least one neural network accelerator has completed performing the first subset of layers of the neural network on the input data; and
- the second processor element to read the intermediate data set from the shared memory queue in response to the signal from the first processor element.

* * * * *